(12) United States Patent
Misulia (10) Patent No.: US 12,397,979 B2
(45) Date of Patent: Aug. 26, 2025

(54) INTEGRATED CABLE PACKAGING, DEPLOYMENT AND STRUMMING MITIGATION SYSTEM

(71) Applicant: Raytheon Company, Arlington, VA (US)

(72) Inventor: Joseph M. Misulia, Attleboro, MA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/500,255

(22) Filed: Nov. 2, 2023

(65) Prior Publication Data

US 2025/0145355 A1   May 8, 2025

(51) Int. Cl.
| | | |
|---|---|---|
| B65D 75/30 | (2006.01) | |
| B65B 5/04 | (2006.01) | |
| B65B 61/02 | (2006.01) | |
| B65D 75/58 | (2006.01) | |
| B65D 85/67 | (2006.01) | |

(Continued)

(52) U.S. Cl.
CPC .............. B65D 75/30 (2013.01); B65B 5/04 (2013.01); B65B 61/02 (2013.01); B65D 75/5888 (2013.01); B65D 85/67 (2013.01); G01V 1/3843 (2013.01); F16F 7/10 (2013.01); F16F 2222/08 (2013.01); G01V 1/186 (2013.01)

(58) Field of Classification Search
CPC .... B65D 75/30; B65D 75/58; B65D 75/5888; B65D 85/04; B65D 85/67; B65H 55/04; B65H 75/02; F16F 7/10; F16F 2222/08; G01V 1/18; G01V 1/20; G01V 1/38;

(Continued)

(56) References Cited

U.S. PATENT DOCUMENTS

| 4,190,012 A | * | 2/1980 | Rispin | B63B 21/663 |
| | | | | 114/243 |
| 6,811,112 B1 | * | 11/2004 | Currie | B65H 54/2872 |
| | | | | 242/548.1 |

(Continued)

FOREIGN PATENT DOCUMENTS

| AU | 2002-228964 B2 | 6/2002 |
| CN | 114455001 A | 5/2022 |
| WO | WO 2018/004772 A2 | 1/2018 |

OTHER PUBLICATIONS

"International Application Serial No. PCT/US2024/053654, International Search Report mailed Feb. 6, 2025", 4 pgs.

(Continued)

Primary Examiner — Bryon P Gehman
(74) Attorney, Agent, or Firm — Schwegman Lundberg & Woessner, P.A.

(57) ABSTRACT

A cable package for a line array and a method thereof including a first sheet of material, a cable wound in a serpentine shape, where a portion of the cable contacts the first sheet of material, and a second sheet of material attached to the cable and areas of the first sheet of material not occupied by the cable, wherein areas of the second sheet of material attached to the first sheet of material not occupied by the cable comprises scoring lines to enable separation under tension to form a plurality of strumming mitigation fairings, and wherein the cable with scoring lines in the areas of the second sheet of material attached to the first sheet of material not occupied by the cable is folded onto itself.

20 Claims, 7 Drawing Sheets

(51) Int. Cl.
*G01V 1/38* (2006.01)
*F16F 7/10* (2006.01)
*G01V 1/18* (2006.01)

(58) Field of Classification Search
CPC .......... G01V 1/18; G01V 1/3843; B65B 5/04; B65B 61/02
USPC ................................................ 206/389–416
See application file for complete search history.

(56) References Cited

U.S. PATENT DOCUMENTS

| | | |
|---|---|---|
| 9,874,298 B2 | 1/2018 | Peters |
| 10,209,379 B2 | 2/2019 | Griffin et al. |
| 11,414,161 B1 | 8/2022 | Coakley |
| 2002/0062778 A1* | 5/2002 | Barker .................. G01V 1/201 114/253 |
| 2005/0045511 A1* | 3/2005 | Lin ...................... B65D 25/108 206/388 |
| 2010/0074048 A1 | 3/2010 | Furuhaug |
| 2015/0166298 A1* | 6/2015 | Ho ..................... B65H 75/4471 206/408 |
| 2017/0315247 A1 | 11/2017 | Griffin et al. |

OTHER PUBLICATIONS

"International Application Serial No. PCT/US2024/053654, Written Opinion mailed Feb. 6, 2025", 6 pgs.

* cited by examiner

INTEGRATED CABLE PACKAGING,
DEPLOYMENT AND STRUMMING
MITIGATION SYSTEM

BACKGROUND

A vertical line array comprises at least one hydrophone cable with at least one hydrophone attached to each hydrophone cable. Controlling a vertical line array shape during operation in the presence of a cross flow current in liquid (e.g., water) is often challenging. As liquid (e.g., water) flow increases a catenary may be formed in a vertical line array which negatively impacts acoustic performance of the vertical line array. A conventional method of maintaining a vertical line array in the presence of liquid (e.g., water) cross flow current is to increase the tension in the vertical line array by deploying the vertical line array with a large float on one end and a large terminal weight or lug on the other end. Increasing tension in a circular cable member of a vertical line array often introduces and/or exacerbates cable strumming of the vertical line array which may be detrimental to the acoustic function of the vertical line array.

A conventional method of mitigating cable strumming in a vertical line array is to apply treatments to a cable of the vertical line array to alter the mechanical characteristics of the vertical line array (e.g., adding a mass to the vertical line array or altering a cross section of the vertical line array that is presented to a cross flow of liquid (e.g., water)). However, adding a treatment to a cable or a support line of a vertical line array may increase the complexity of deploying the vertical line array and increase the risk that the deployment of the vertical line array may fail. Thus, there is a need for a device for and a method of applying anti-strumming mitigation to a vertical line array in an efficient, low risk, low size, low weight or lug, and low power (SWAP) manner.

Tabs have been added to a vertical line array to reduce strumming in the vertical line array in the presence of a cross flow of liquid (e.g., water). However, adding tabs or other strumming mitigation treatments to a vertical line array may make packaging a cable for autonomous deployment challenging and unreliable.

SUMMARY

In accordance with the concepts described herein, exemplary devices and methods provide an autonomous, low SWAP solution for deployment of an acoustic line array and an acoustic volumetric array in any orientation.

In accordance with the concepts described herein, exemplary devices and methods package a cable and/or rope strength members of a line array in any orientation to ensure deployment from a small form factor and strumming mitigation.

DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principles of the concepts described herein. Like reference numerals designate corresponding parts throughout the different views. Furthermore, embodiments are illustrated by way of example and not limitation in the figures, in which.

DETAILED DESCRIPTION

The present disclosure discloses packaging and deployment of a cable for a line array in any orientation (e.g., vertical, horizontal, diagonal, etc.) with cable strumming mitigation. The strumming mitigation enables reliable, dependable, and autonomous deployment of a cable or a strength member of a line array. The present disclosure discloses devices and methods of adding tabs to a cable for a line array, and using the structures of the tabs to pack the cable into a small form factor which may be autonomously deployed reliably.

FIGS. 1A, 1B, 1C, 1D, 1E, 1F, 1G, and 1H are illustrations of an exemplary method of constructing and packaging a cable for a line array in any orientation (e.g., vertical, horizontal, diagonal, etc.) with strumming mitigation in a small form factor that may be autonomously deployed reliably according to the present disclosure.

Figure 1A:
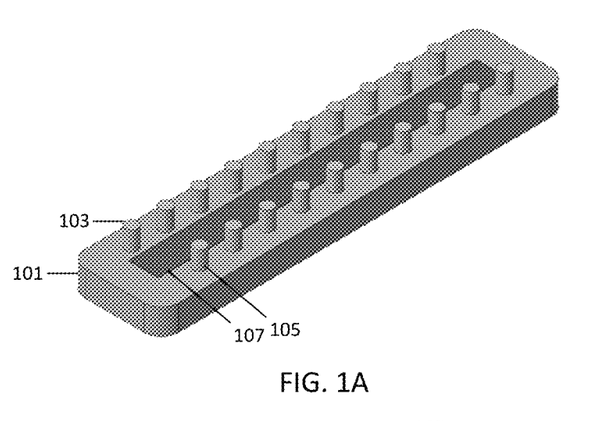
FIGS. 1A, 1B, 1C, 1D, 1E, 1F, 1G, and 1H are illustrations of an exemplary cable for a line array with strumming mitigation in a small form factor that may be autonomously deployed reliably according to the present disclosure.

FIG. 1A illustrates a winder tool 101, a first row of pegs 103, a second row of pegs 105, and a first sheet 107. The winder tool 101 may be any user-definable length and any user-definable width.

The first row of pegs 103 and the second row of pegs 105 are each attached to (e.g., partially embedded in) and along a length of the winder tool 101, where the first row of pegs 103 and the second row of pegs 105 are each orthogonal to the winder tool 101. The pegs in first row of pegs 103 and the pegs in the second row of pegs 105 are spaced across and offset from each other, respectively. FIG. 1A illustrates 10 pegs in each of the first row of pegs 103 and the second row of pegs 105. However, the present disclosure is not limited thereto. There may be any suitable number of pegs. However, the number of pegs may be limited by the length of winder tool 101 and a width of a cable used to fabricate a line array on the winder tool 101. The pegs in the first row of pegs 103 and the second row of pegs 105 may be any height above a top surface of the winder tool 101, where the height of the pegs may be equal to the width of a cable used to fabricate a line array on the winder tool 101. However, the height of the pegs in the first row of pegs 103 and the second row of pegs 105 may be less than or greater than the width of a cable used to fabricate a line array on the winder tool 101 so long as the pegs can retain the cable on the pegs while fabricating the line array. The pegs in the first row of pegs 103 and the second row of pegs 105 may be any suitable width (e.g., any width that accommodates a line array fabricated on the winder tool 101).

The first sheet 107 has a bottom side and a top side. The first sheet 107 thermoplastic. The bottom side of the first sheet 107 may be non-adhesive while the top side of the first sheet 107 comprises an adhesive layer. The first sheet 107 is applied bottom-side (e.g., non-adhesive-side) down onto the winder tool 101 and between the first row of pegs 103 and the second row of pegs 105. Thus, the top side of the first sheet 107 that includes an adhesive layer faces up from the winder tool 101. The length of the first sheet 107 may be as long as, or shorter than, the length of each of the first row of pegs 103 and the second row of pegs 105.

Figure 1B:
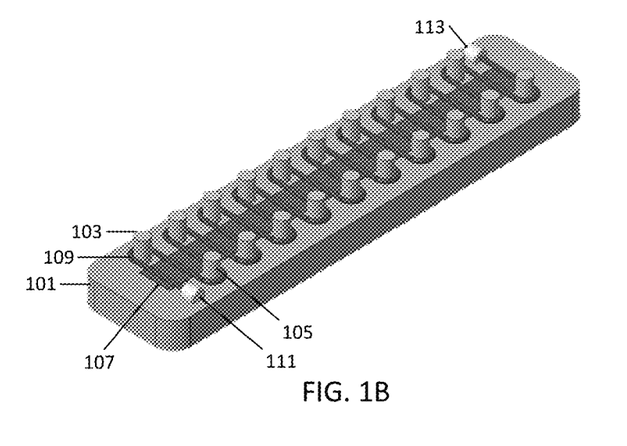

FIG. 1B illustrates the winder tool 101, the first row of pegs 103, the second row of pegs 105, the first sheet 107, a cable 109, a flotation device or lug 111, and a weight or lug 113. The flotation device or lug 111 is attached to a first end of the cable 109 and the weight or lug 113 is attached to a second end of the cable 109. The cable 109 may be a hydrophone cable. The cable 109 (e.g., a hydrophone cable), the flotation device or lug 111, the weight or lug 113, and hydrophones (not shown) attached to the cable 109 form a line array in any orientation (e.g., vertical, horizontal, diagonal, etc.). The cable 109, with the flotation device or lug 109 and the weight or lug 113 attached thereto, is wound around the first row of pegs 103 and the second row of pegs 105 in a serpentine fashion and in contact with the adhesive on the top side of the first sheet 107. Thus, the cable 109 adheres to the top side of the first sheet 107.

The length of the cable 109 fabricated on the winder tool 101 is a function of the length of the winder tool 101, the spacing between the first row of pegs 103 and the second row of pegs 105, and the number of pegs around which the cable 109 is wound. Thus, the length of the cable 109 may be longer, shorter, or equal to the length of the winder tool 101.

Figure 1C:
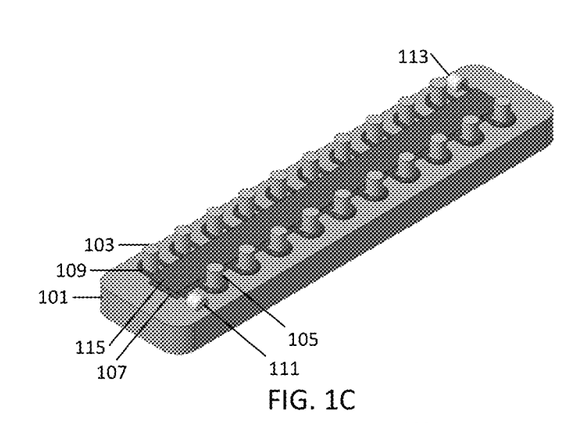

FIG. 1C illustrates the winder tool 101, the first row of pegs 103, the second row of pegs 105, the first sheet 107, the cable 109, the flotation device or lug 111, the weight or lug 113, and a second sheet 115.

The second sheet 115 has a bottom side and a top side. The second sheet 115 may be thermoplastic. The bottom side of the second sheet 115 comprises an adhesive layer while the top side of the second sheet 115 may be non-adhesive. The second sheet 115 is applied bottom-side (e.g., adhesive-side) down onto the cable 109 and between the first row of pegs 103 and the second row of pegs 105.

Figure 1D:
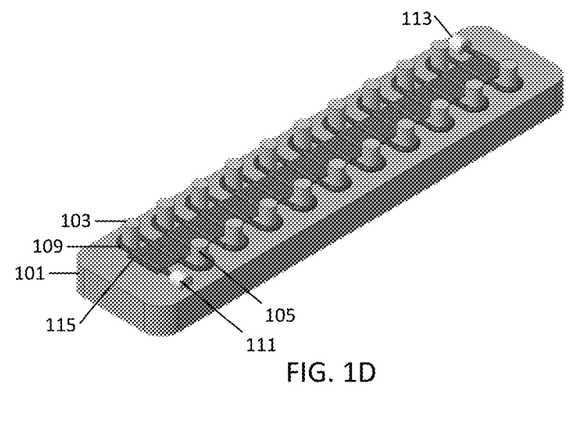

FIG. 1D illustrates the winder tool 101, the first row of pegs 103, the second row of pegs 105, the first sheet 107, the cable 109, the flotation device or lug 111, the weight or lug 113, and the second sheet 115. The bottom side of the second sheet 115 is pressed down to not only adhesively secure sections of the cable 109 between the first sheet 107 and the second sheet 115 but also adhesively secure the second sheet 115 to the first sheet 107 in the areas of the first sheet 107 not occupied by the cable 109. The length of the second sheet 115 may be slightly longer than the first sheet 107 to enable the second sheet 115 to not only adhesively adhere to the cable but also to the areas of first sheet 107 that are not occupied by the cable 109.

Figure 1E:
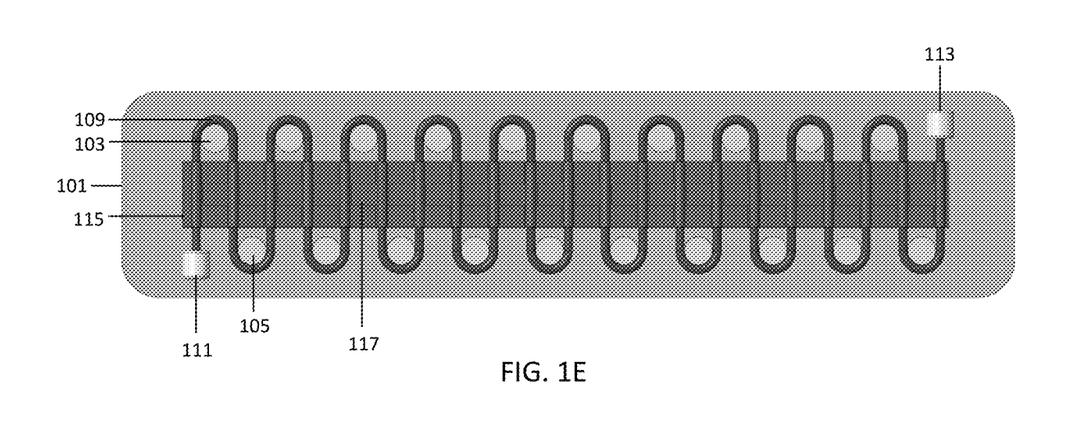

FIG. 1E illustrates the winder tool 101, the first row of pegs 103, the second row of pegs 105, the cable 109, the flotation device or lug 111, the weight or lug 113, the second sheet 115 (over the first sheet 107 and sections of the cable 109), and score lines 117. The score lines 117 are inscribed on the second sheet 115 between adjacent sections of the cable 109 adhesively secured between the first sheet 107 and the second sheet 115. The score lines 117 indicate where a scoring tool (not shown) scores through the adhesively secured sections of the second sheet 115 and the first sheet 107 so that when the cable 109 is removed from the winder tool 101, packaged, and then deployed (e.g., autonomously deployed), part, but not all, of the combination of the first sheet 107 and the second sheet 115 detaches from one of the adjacent sections of the cable 109 adhesively secured between the first sheet 107 and the second sheet 115 and forms a fairing (or cable treatment) on the other adjacent section of the cable 109 adhesively secured between the first sheet 107 and the second sheet 115 as illustrated, for example, in FIGS. 1F and 1G and described below in greater detail. The width of the fairings is a function of the widths of the first sheet 107 and the second sheet 115. The length of the fairings is a function of the spacing between adjacent sections of the cable 109 adhesively secured between the first sheet 107 and the second sheet 115.

Figure 1F:
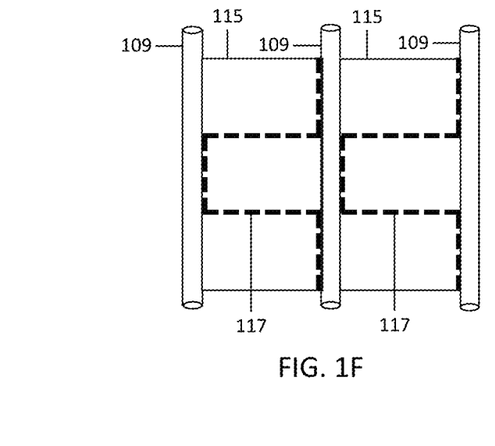

FIG. 1F illustrates three subsections of the cable 109, the second sheet 115 (above the first sheet 107 and a section of the cable 109), and the score lines 117. For ease of explanation, the three subsections of the cable 109, which are adhesively secured between the first sheet 107 and the second sheet 115, do not show how the three subsections of the cable 109 are connected to each other but are shown with one subsection of the cable 109 between two other subsections of the cable 109, where the first sheet 107 and the second sheet 115 are adhesively secured to each of the subsections of the cable 109 and adhesively secured to each other in areas not occupied by the cable 109. In FIG. 1F, the score lines 117 (one score line 117 between adjacent sections of the cable 109) are shown as being identical to each other. However, the present disclosure is not limited thereto. Each score line 117 may be unique. In addition, a set of any number of unique score lines 117 may be used in any order. In the example shown in FIG. 1F, the score lines 117 each form a step function rotated 90 degrees. The score lines 117 are scored through the first sheet 107 and the second sheet 115 using a scoring tool (e.g., a tool with a razor edge).

Figure 1G:
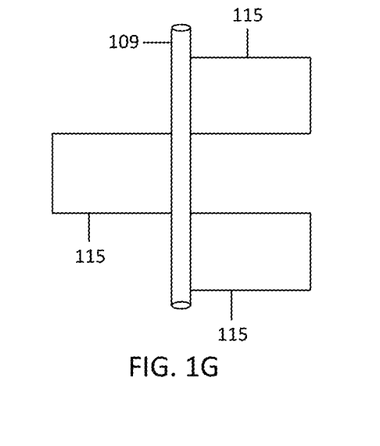

FIG. 1G illustrates the center of the three subsections of the cable 109 of FIG. 1F after the cable 109 is removed from the winding tool 101 and deployed (e.g., stretched straight). Thus, a part (e.g., a center part) of a combination of the first sheet 107 adhesively secured to the second sheet 115 detaches from the left-most subsection of the cable 109 in FIG. 1F and forms a single-tab fairing on the left side of the center subsection of the cable 109 and a part (e.g., a top part and a bottom part) of the combination of the first sheet 107 adhesively secured to the second sheet 115 detaches from the right-most subsection of the cable 109 in FIG. 1F and forms a two-tab fairing on the right side of the center subsection of the cable 109.

Figure 1H:
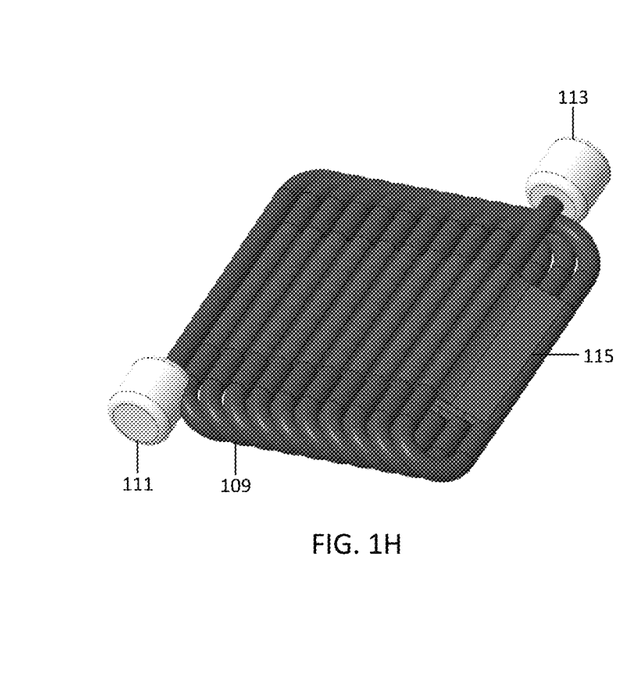

FIG. 1H illustrates the cable 109, the flotation device or lug 111, the weight or lug 113, the second sheet 115 (over the first sheet 107 and sections of the cable 109, and with score lines 117). In FIG. 1H, the configuration illustrated in FIG. 1E is remove from the winder tool 101 and layered onto itself (e.g., in an accordion fashion) to form a cable pack ready for autonomous deployment, wherein the sections of the adhesively secured first sheet 107 and second sheet 115 are bonded to adjacent sections using a low tack adhesive, a plastic welder, an instant adhesive, or a similar material or tool.

Figure 2A:
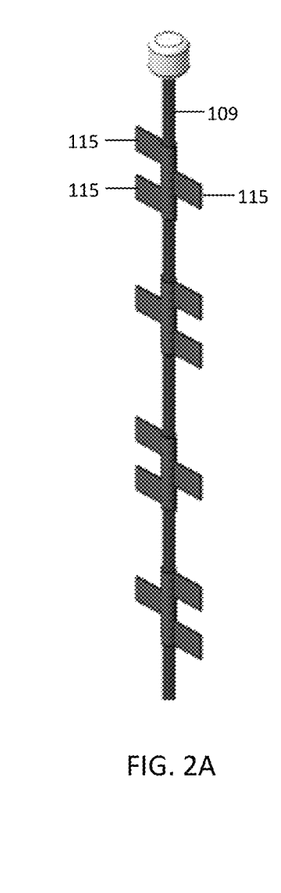
FIG. 2A is an illustration of the cable of FIGS. 1A-1H in a deployed state prior to experiencing a flow of liquid according to the present disclosure.

FIG. 2A is an illustration of a section of the cable 109 for a line array of FIGS. 1A-1H in a vertically deployed state prior to experiencing a flow of liquid (e.g., liquid) according to the present disclosure. However, the cable 109 may be deployed in other orientations (e.g., horizontal, diagonal, etc.). FIG. 2A illustrates a section of the cable 109 and the second sheet 115 (above the first sheet 107 and a section of the cable 109) in a deployed state for the configuration illustrated in FIG. 1E. That is, the cable 109 has multiple copies of the fairing of FIG. 1G, except for the first and last fairings on the cable 109, where adjacent fairings are rotated horizontally from each other. The fairings on the ends of the cable 109 may be missing one side of the fairing illustrated in FIG. 1G because the subsections of the ends of the cable 109 do not have a subsection of the scored first sheet 107 and the second sheet 115 on one side of the cable 109.

A pack of the cable 109 illustrated in FIG. 1H may be deployed when a load is applied to cable lugs. In this case, each combination of adhesively secured first sheet 107 and the second sheet 115 separates along the score lines 117. In liquid (e.g., water), either side of a fairing (e.g., the one-tab side or the two-tab side in the example of FIG. 1G foldably wraps around the cable 109 due to liquid (e.g., water) flow across the fairing.

Figure 2B:
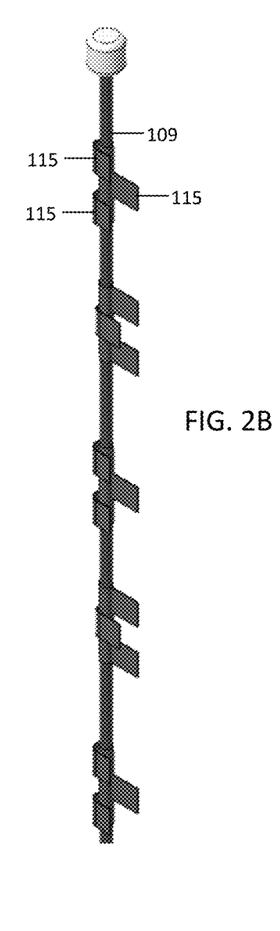
FIG. 2B is an illustration of the cable of FIGS. 1A-1H in a deployed state after experiencing a flow of liquid according to the present disclosure.

FIG. 2B is an illustration of the cable 109 for a line array of FIGS. 1A-1H in a vertically deployed state after experiencing a flow of liquid (e.g., water) according to the present disclosure. In FIG. 2B, the top fairing illustrates the two-flap section of the fairing being foldably attached to the cable 109. However, the cable 109 may be deployed in other orientations (e.g., horizontal, diagonal, etc.). The fairing next to the top fairing in FIG. 2B illustrates the one-flap section of the fairing being foldably attached to the cable 109. This pattern repeats for the bottom two fairings illustrated in FIG. 2B. However, the present disclosure is not limited thereto. The fairings may become foldable attached to the cable 109 in an opposite configuration due to a different type of liquid (e.g., water) flow (e.g., the top fairing having the one-flap section of the fairing foldably attached to the cable 109, the fairing next to the top fairing having the two-flap section of the fairing foldably attached to the cable 109, and having this pattern repeat for the rest of the cable 109).

The cable 109 may have a small diameter (e.g., 1 millimeter) up to a large diameter (e.g., 100 centimeters). Any length of cable 109 and cable termination may be used.

At times, it may be advantages to adjust a resonant frequency of the cable 109 to above or below a vibration induced vortex shedding frequency to avoid vibration amplification. The packaging and deployment of the cable 109 may be adjusted to raise or lower the resonant frequency of the cable 109 by adding or reducing the mass of the applied fairing. Adding mass in between the first sheet 107 and the second sheet 115 may reduce the resonant frequency of the cable 109. Lead pellets or lead tabs may be sandwiched between the first sheet 107 and the second sheet 115. The thickness and/or widths of the first sheet 107 and the second sheet may also be adjusted to raise or lower the resonant frequency of the cable 109.

Figure 3A:
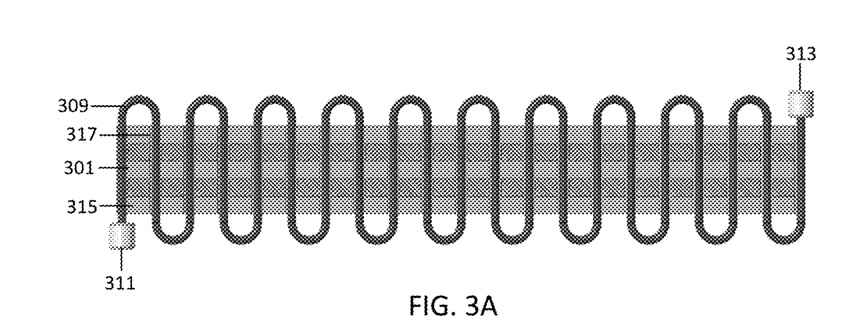
FIGS. 3A, 3B, and 3C are illustrations of an exemplary alternate embodiment of a cable for a line array with strumming mitigation in a small form factor that may be autonomously deployed reliably according to the present disclosure.

FIG. 3A is an illustration of an exemplary alternate embodiment of a cable 309 for a line array in any orientation (e.g., vertical, horizontal, diagonal, etc.) with strumming mitigation in a small form factor that may be autonomously deployed reliably according to the present disclosure. The configuration of the cable 309 in FIG. 3A is fabricated identically as the cable 109 of FIG. 1E using identical elements and materials but with a different score line 317 for making a different fairing than the fairing of FIG. 1E. FIG. 3A illustrates the cable 109, a flotation device or lug 311, a weight or lug 313, a second sheet 315 (over a first sheet (not shown) and sections of the cable 309), and the score lines 317. The score lines 317 are inscribed on the second sheet 315 between adjacent sections of the cable 309 adhesively secured between the first sheet (not shown) and the second sheet 315. The score lines 317 indicate where a scoring tool (not shown) scores through the adhesively secured sections of the second sheet 315 and the first sheet (not shown) so that when the cable 309 is removed from a winder tool (not shown), packaged, and then deployed (e.g., autonomously deployed), part, but not all, of the combination of the first sheet (not shown) and the second sheet 315 detaches from one of the adjacent sections of the cable 309 adhesively secured between the first sheet (not shown) and the second sheet 315 and forms a fairing (or cable treatment) on the other adjacent section of the cable 309 adhesively secured between the first sheet (not shown) and the second sheet 315 as illustrated, for example, in FIGS. 3B and 3C and described below in greater detail. The width of the fairings is a function of the widths of the first sheet (not shown) and the second sheet 315. The length of the fairings is a function of the spacing between adjacent sections of the cable 309 adhesively secured between the first sheet (not shown) and the second sheet 315.

Figure 3B:
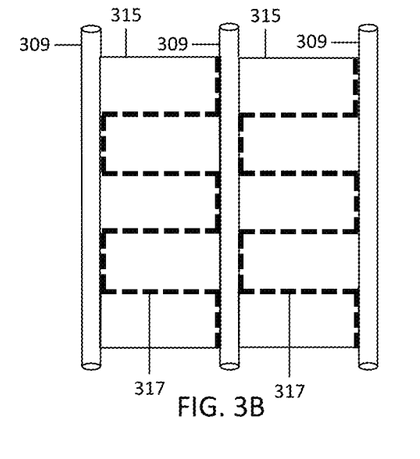

FIG. 3B illustrates three subsections of the cable 309, the second sheet 315 (above the first sheet (not shown) and a section of the cable 309), and the score lines 317. For ease of explanation, the three subsections of the cable 309, which are adhesively secured between the first sheet (not shown) and the second sheet 315, do not show how the three subsections of the cable 309 are connected to each other but are shown with one subsection of the cable 309 between two other subsections of the cable 309, where the first sheet (not shown) and the second sheet 315 are adhesively secured to each of the subsections of the cable 309 and adhesively secured to each other in areas not occupied by the cable 309. In FIG. 3B, the score lines 317 (one score line 317 between adjacent sections of the cable 309) are shown as being identical to each other. However, the present disclosure is not limited thereto. Each score line 317 may be unique. In addition, a set of any number of unique score lines 317 may be used in any order. In the example shown in FIG. 3B, the score lines 317 each form two step functions rotated 90 degrees. The score lines 317 are scored through the first sheet (not shown) and the second sheet 315 using a scoring tool (e.g., a tool with a razor edge).

Figure 3C:
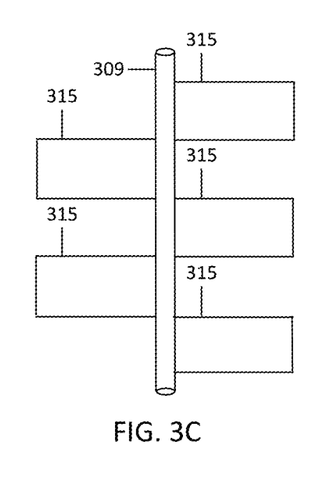

FIG. 3C illustrates the center of the three subsections of the cable 309 of FIG. 3B after the cable 309 is removed from a winding tool (not shown) and deployed (e.g., stretched straight). Thus, a part (e.g., a center part) of a combination of the first sheet (not shown) adhesively secured to the second sheet 315 detaches from the left-most subsection of the cable 309 in FIG. 3B and forms a two-tab fairing on the left side of the center subsection of the cable 309 and a part (e.g., a top part and a bottom part) of the combination of the first sheet (not shown) adhesively secured to the second sheet 315 detaches from the right-most subsection of the cable 309 in FIG. 3B and forms a three-tab fairing on the right side of the center subsection of the cable 309.

For example, a first sheet of thermoplastic may be placed on a winding tool between two rows of pins of the winding tool. The winding tool may further comprise features to hold cable end lugs. A cable may be wound on top of the first sheet of thermoplastic. A second sheet of thermoplastic may be adhesively bonded to both the cable and the first sheet of thermoplastic. The thermoplastic between adjacent sections of cable may be scored along lines so that when the cable is deployed the thermoplastic separates to form a pattern of tabs on each side of sections of the cable. An exemplary cable may have a diameter of 0.125 inches and a length of 1.25 meters.

The cable may be packaged by layering the cable onto itself. Different sections of the adhesively bonded first and second thermoplastic sheets may be further bonded together through an interior of the packaged cable. Alternatively, a ring of thermoplastic may be used to hold the packaged cable together prior to deployment. In addition, thermoplastic sheets may be welded together. The final form of the packaged cable may result in a very small SWAP. Applying a tension load to the cable ends may cause the scored lines to separate and to form the fairings (e.g., the strumming mitigation tabs). Such a continuous sheet through cable package ensures that the cable may not snag/knot/hockle during deployment.

Figure 4A:
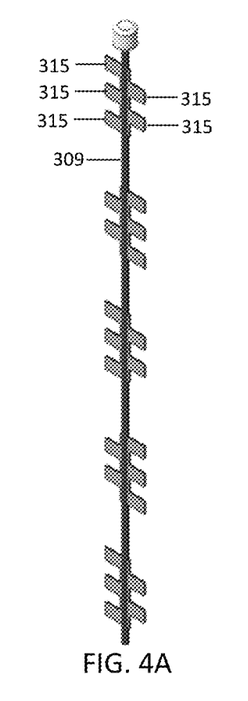
FIG. 4A is an illustration of the cable of FIG. 3A in a deployed state prior to experiencing a flow of liquid according to the present disclosure.

FIG. 4A is an illustration of the cable 309 of FIG. 3A in a vertically deployed state prior to experiencing a flow of liquid (e.g., water) according to the present disclosure. However, the cable 309 may be deployed in other orientations (e.g., horizontal, diagonal, etc.). FIG. 4A illustrates a section of the cable 309 and the second sheet 315 (above the first sheet (not shown) and a section of the cable 309) in a vertically deployed state for the configuration illustrated in FIG. 3A. That is, the cable 309 has multiple copies of the fairing of FIG. 3C, except for the first and last fairings on the cable 309, where adjacent fairings are rotated horizontally from each other. The fairings on the ends of the cable 309 may be missing one side of the fairing illustrated in FIG. 3C because the subsections of the ends of the cable 309 do not have a subsection of the scored first sheet (not shown) and second sheet 315 on one side of the cable 309.

A pack of the cable 309 may be deployed when a load is applied to cable lugs. In this case, each combination of adhesively secured first sheet (not shown) and the second sheet 315 separates along the score lines 317. In liquid (e.g., water), either side of a fairing (e.g., the two-tab side or the three-tab side in the example of FIG. 3C foldably wraps around the cable 309 due to liquid (e.g., water) flow across the fairing.

Figure 4B:
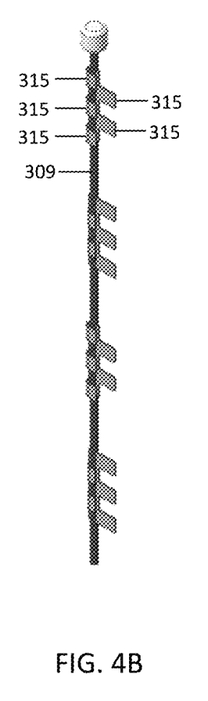
FIG. 4B is an illustration of the cable of FIG. 3A in a deployed state after experiencing a flow of liquid according to the present disclosure.

FIG. 4B is an illustration of the cable 309 of FIG. 3A in a vertically deployed state after experiencing a flow of liquid (e.g., water) according to the present disclosure. However, the cable 309 may be deployed in other orientations (e.g., horizontal, diagonal, etc.). In FIG. 4B, the top fairing illustrates the three-flap section of the fairing being foldably attached to the cable 309. The fairing next to the top fairing in FIG. 4B illustrates the two-flap section of the fairing being foldably attached to the cable 309. This pattern repeats for the bottom two fairings illustrated in FIG. 4B. However, the present disclosure is not limited thereto. The fairings may become foldable attached to the cable 309 in an opposite configuration due to a different type of liquid (e.g., water) flow (e.g., the top fairing having the two-flap section of the fairing foldably attached to the cable 309, the fairing next to the top fairing having the three-flap section of the fairing foldably attached to the cable 309, and having this pattern repeat for the rest of the cable 309).

During deployment, a load is applied to cable ends of the cable 309. The scored combinations of the first sheet (not shown) and the second sheet 315 tear along the scored lines. The fairing tabs formed when the cable 309 is deployed (e.g., straightened out) form anti-strumming mitigation treatment for the cable 309. A continuous sheet formed during packaging of the cable 309 ensures that deployment of the cable 309 may be snag free and reliable in a very low SWAP form factor.

Figure 5:
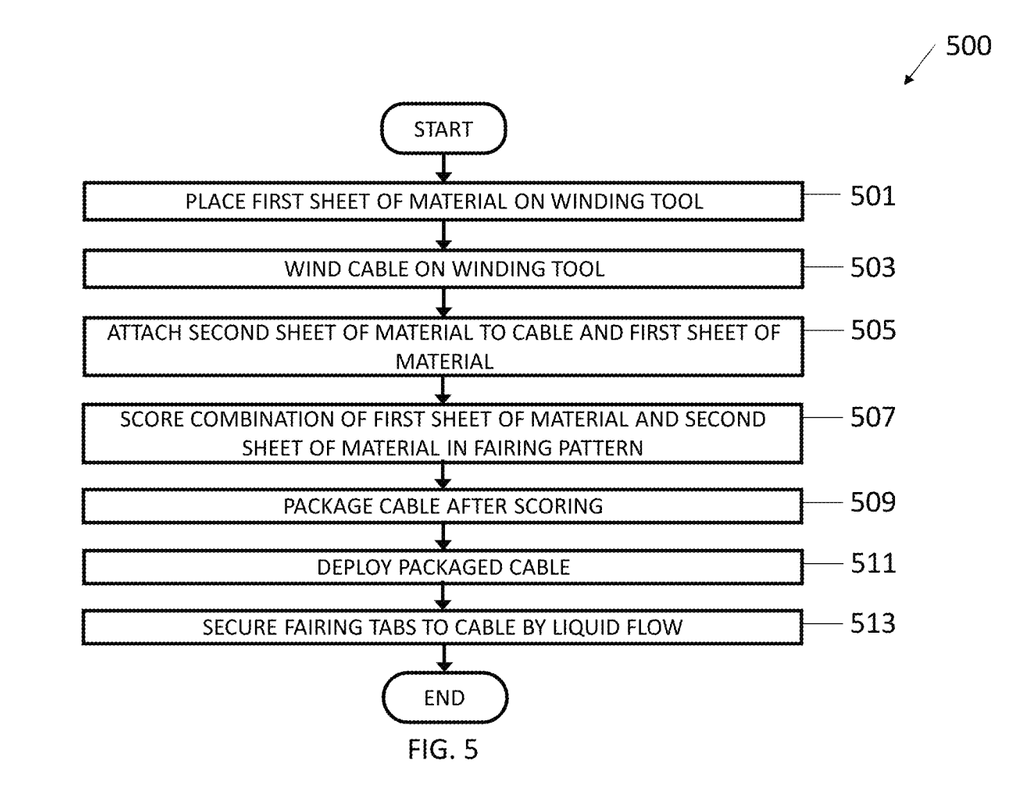
FIG. 5 is a flowchart of an exemplary method of constructing and packaging a cable for a line array with strumming mitigation in a small form factor that may be autonomously deployed reliably according to the present disclosure.

FIG. 5 is a flowchart of an exemplary method 500 of constructing and packaging a cable for a line array in any orientation (e.g., vertical, horizontal, diagonal, etc.) with strumming mitigation in a small form factor that may be autonomously deployed reliably according to the present disclosure. Step 501 of the method 500 comprises laying a first sheet of material (e.g., thermoplastic) on a winding tool. The winding tool comprises two rows of any number of pegs orthogonally attached to the winding tool, where the two rows of pegs are spaced apart, and offset, from each other.

Step 503 of the method 500 comprises winding a cable on the winding tool, where the cable winds alternatively around the pegs of the first row of pegs and the second row of pegs. The cable further comprises a floatation device on a first end of the cable and a weight or lug on a second end of the cable.

Step 505 of the method 500 comprises attaching a second sheet of material (e.g., thermoplastic) to both the cable and the first sheet of material. The second sheet of material may be adhesively attached to the cable and the first sheet of material.

Step 507 of the method 500 comprises scoring the combination of the first sheet of material (e.g., thermoplastic) and the second sheet of material (e.g., thermoplastic) in a fairing pattern. A tool with a razor edge may be used for scoring. The scoring pattern between adjacent sections of the cable may be identical, unique, or a set of unique patterns in any order.

Step 509 of the method 500 comprises packaging the cable after scoring. The packaging may comprise layering the cable onto itself, where each section of the combination of the first sheet of material and the second sheet of material is bonded to an adjacent section of the combination of the first sheet of material and the second sheet of material. An additional sheet of material (e.g., thermoplastic) may ring the packaged cable.

Step 511 of the method 500 comprises deploying the packaged cable. The packaged cable may be deployed by applying tension on a weight or lug on a second end of the cable to separate the scored combinations of the first sheet material and the second sheet material to form fairings on the cable for strumming mitigation.

Step 513 of the method 500 comprises securing fairing tabs to the cable by liquid (e.g., water) flow. The fairing(s) on either side of a section of the cable may be secured (e.g., wrapped around) the cable due to a flow of liquid (e.g., water).

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

Various embodiments of the concepts, systems, devices, structures and techniques sought to be protected are described herein with reference to the related drawings. Alternative embodiments can be devised without departing from the scope of the concepts, systems, devices, structures and techniques described herein.

It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "at least one" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal, "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A cable package for a line array, comprising:
a first sheet of material;
a cable wound in a serpentine shape, where a portion of the cable contacts the first sheet of material; and
a second sheet of material attached to the cable and areas of the first sheet of material not occupied by the cable,
wherein the areas of the second sheet of material attached to the first sheet of material not occupied by the cable comprise scoring lines to enable separation under tension to form a plurality of strumming mitigation fairings; and
wherein the cable with scoring lines in the areas of the second sheet of material attached to the first sheet of material not occupied by the cable is folded onto itself.

2. The cable package of claim 1, wherein the first sheet of material comprises a bottom, non-adhesive side and a top side and further comprising an adhesive layer on the top side of the first sheet of material.

3. The cable package of claim 1, wherein the first sheet of material and the second sheet of material are each a thermoplastic material.

4. The cable package of claim 1, further comprising:
a flotation device on a first end of the cable; and
a weight on a second end of the cable.

5. The cable package of claim 1, wherein each of the plurality of strumming mitigation fairings comprises at least one tab on a first side of a section of the cable and at least two tabs on a second side of the section of cable.

6. The cable package of claim 5, wherein one of each at least one tab on the first side of the section of the cable and at least two tabs on the second side of the section of cable are foldably attached to the cable by a flow of liquid.

7. The cable package of claim 1, wherein the second sheet of material attached to the first sheet of material is one of scored in identically between adjacent sections of the cable, scored uniquely between adjacent sections of the cable, and scored using a set of different scoring patterns in any order between adjacent sections of the cable.

8. The cable package of claim 1, further comprising a weight between each area of the first material attached to the second material not occupied by the cable.

9. The cable package of claim 8, wherein the weight is a lead pellet or a lead tab.

10. The cable package of claim 1, wherein the cable comprises a diameter in a range of from 1 millimeter to 100 centimeters.

11. A method of packaging a cable for a line array, comprising:
placing a first sheet of material on a winding tool;
winding a cable in a serpentine shape on the winding tool, where a portion of the cable contacts the first sheet of material;
attaching a second sheet of material attached to the cable and areas of the first sheet of material not occupied by the cable;
scoring lines into areas of the second sheet of material attached to the first sheet of material not occupied by the cable to enable separation under tension to form a plurality of strumming mitigation fairings; and
folding the cable with scoring lines in areas of the second sheet of material attached to the first sheet of material not occupied by the cable onto itself.

12. The method of claim 11, wherein the first sheet of material comprises a bottom, non-adhesive side and a top side and further comprising an adhesive layer on the top side of the first sheet of material.

13. The method of claim 11, wherein the first sheet of material and the second sheet of material are each a thermoplastic material.

14. The method of claim 11, further comprising:
attaching a flotation device on a first end of the cable; and
attaching a weight on a second end of the cable.

15. The method of claim 11, wherein each of the plurality of strumming mitigation fairings comprises at least one tab on a first side of a section of the cable and at least two tabs on a second side of the section of cable.

16. The method of claim 15, further comprising foldably attaching one of each at least one tab on the first side of the section of the cable and at least two tabs on the second side of the section of cable to the cable by a flow of liquid.

17. The method of claim 11, further comprising one of scoring the second sheet of material attached to the first sheet of material identically between adjacent sections of the cable, uniquely between adjacent sections of the cable, and using a set of different scoring patterns in any order between adjacent sections of the cable.

18. The method of claim 11, further comprising inserting a weight between each area of the first material attached to the second material not occupied by the cable.

19. The method of claim 18, wherein the weight is a lead pellet or a lead tab.

20. The method of claim 11, wherein the cable comprises a diameter in a range of from 1 millimeter to 100 centimeters.

* * * * *